(12) United States Patent  
Lenertz et al.

(10) Patent No.: US 6,178,737 B1
(45) Date of Patent: Jan. 30, 2001

(54) COMBUSTOR DILUTION BYPASS METHOD

(75) Inventors: James Lenertz, Scottsdale; Kyle Lawrence, Chandler, both of AZ (US)

(73) Assignee: AlliedSignal Inc., Morris Township, NJ (US)

( * ) Notice: Under 35 U.S.C. 154(b), the term of this patent shall be extended for 0 days.

(21) Appl. No.: 09/517,785

(22) Filed: Mar. 2, 2000

Related U.S. Application Data

(62) Division of application No. 08/966,393, filed on Nov. 7, 1997, now Pat. No. 6,070,406.

(60) Provisional application No. 60/031,780, filed on Nov. 26, 1996.

(51) Int. Cl.[7] .................................................. F23R 3/26
(52) U.S. Cl. .................................................. 60/39.03
(58) Field of Search ............................. 60/39.03, 39.23, 60/39.27, 39.29, 737

(56) References Cited

U.S. PATENT DOCUMENTS

| | | | |
|---|---|---|---|
| 2,458,006 | * | 1/1949 | Farkas et al. ................. 60/39.23 |
| 4,050,238 | * | 9/1977 | Holzapfel ....................... 60/39.23 |
| 5,628,182 | * | 5/1997 | Mowill ............................... 60/737 |

* cited by examiner

Primary Examiner—Louis J. Casaregola
(74) Attorney, Agent, or Firm—Robert Desmond, Esq.

(57) ABSTRACT

The present invention provides a valve and a low pressure drop combustor bypass. The valve simultaneously controls both the supply of air to the premixer and the amount of air directed into a large bypass duct. Air entering the bypass duct is reintroduced into the gas flowpath as dilution air downstream of the combustion zone. At low power settings the valve directs most of the air to the bypass duct, in effect bypassing the fixed area dilution ports, whereby the pressure drop across the combustor may be controlled at an optimal level.

3 Claims, 6 Drawing Sheets

COMBUSTOR DILUTION BYPASS METHOD

REFERENCE TO COPENDING APPLICATION

This is a division of application Ser. No. 08/966,393 filed Nov. 7, 1997 now U.S. Pat. No. 6,070,406, which claims the benefit of U.S. Provisional Application Ser. No. 60/031,780 filed Nov. 26, 1996.

TECHNICAL FIELD

This invention relates generally to controlling airflow to a combustion system for a gas turbine engine or other heat devices. More particularly, the present invention relates to a system including a single valve in conjunction with a combustor dilution bypass duct for selectively controlling the relative proportions of combustion air to air bypassing a main portion of the combustor.

BACKGROUND OF THE INVENTION

Gas turbine engines of the type used for industrial applications may employ combustor systems designed to minimize nitrogen oxide emissions. One such combustor system, disclosed in U.S. Pat. No. 5,481,866, entitled Single Stage Premixed Constant Fuel/Air Ratio Combustor, issued to Mowill on Jan. 9, 1996, is incorporated herein by reference to the extent necessary for a full understanding of such a combustor. The '866 patent discloses a combustor having an externally cooled non-perforated combustor liner that receives all combustion air from a venturi shaped premixer. Excess air that does not enter the combustor through the premixer is ducted so as to externally cool the combustor liner, and eventually re-enters the flowpath downstream of the combustion region through dilution ports. An air valve is used to directly control the amount of air supplied to the premixer so as to minimize nitrous oxide emissions at all power settings. The air valve has the effect of indirectly controlling the amount of air routed to the dilution ports.

A problem occurs when combustors of the type disclosed in the '866 patent are used in conjunction with an engine having a compressor with a relatively high compression ratio. At low engine power settings, the valve used to control air to the premixer is mostly closed forcing most of the compressed air through the dilution ports. Although engine power is reduced, the total volume of air being pumped by the compressor at low power or idle settings remains high, resulting in a substantial increase in dilution airflow at reduced power. However, the dilution ports are necessarily sized to provide adequate backflow margin at the lower flow, higher power settings. Thus at reduced power, higher dilution flow conditions, the dilution ports overly restrict the dilution airflow causing a larger than desired pressure drop across the combustor and a loss of engine efficiency.

One solution has been to provide a separate apparatus for varying the flow area of the dilution ports at different power settings in addition to a valve for controlling air to the premixer. A disadvantage is that such apparatus are typically very complex, adding significantly to the total cost of the combustor system.

Accordingly, a need exists in a low nitrous oxide emissions combustor system for a simplified method of reintroducing excess air not used for combustion back into the flowpath downstream of the combustion zone without the complexity and expense associated with variable area dilution ports.

SUMMARY OF THE INVENTION

In view of the above, it is an object for this invention to provide a combustor system designed for low nitrous oxide emissions for a simplified method of reintroducing excess air not used for combustion, back into the flowpath downstream of the combustion zone without the complexity and expense associated with variable area dilution ports.

The present invention achieves these objects by providing a valve and a low pressure drop combustor bypass duct. The valve simultaneously controls both the supply of air to the premixer, and the amount of air directed into a large bypass duct. Air entering the bypass duct is reintroduced into the gas flowpath as dilution air downstream of the primary combustion zone. At low power settings the valve directs most of the air to the bypass duct, in effect adding dilution flow to that provided through the fixed area dilution ports, whereby the pressure drop across the combustor may be controlled at an optimal level.

These and other objects, features and advantages of the present invention are specifically set forth in or will become apparent from the following detailed description of a preferred embodiment of the invention when read in conjunction with the accompanying drawings.

DESCRIPTION OF THE PREFERRED EMBODIMENT

Figure 1:
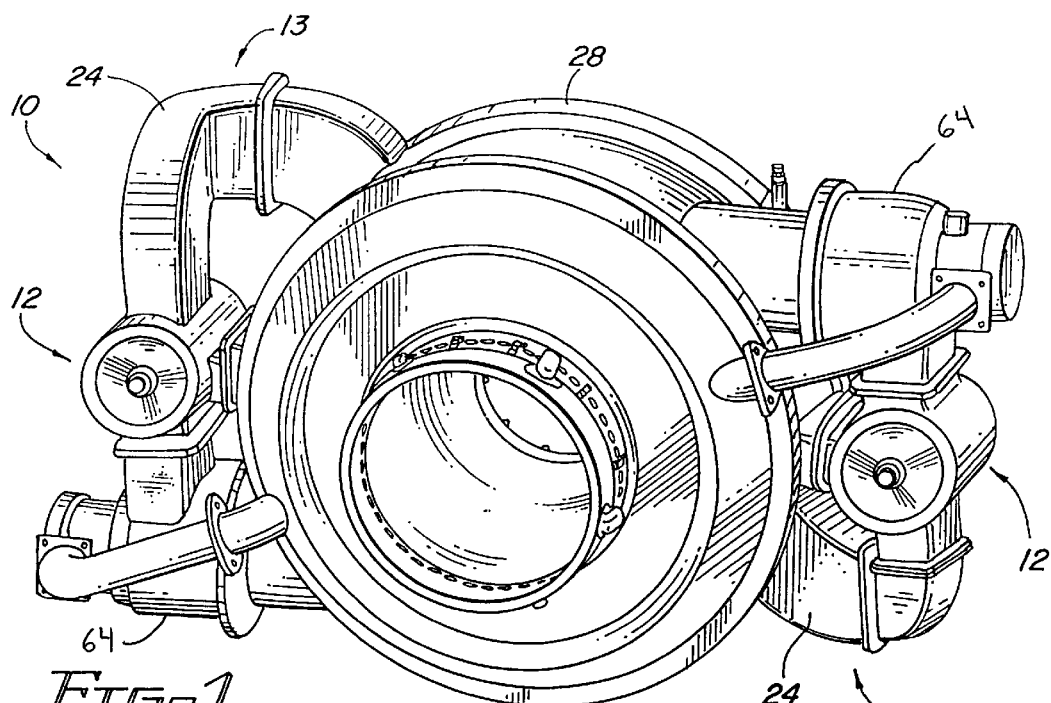
FIG. 1 depicts a perspective view of a low emissions combustor with two dilution bypass systems of the type contemplated by the present invention.

Referring to FIG. 1 the bypass system of the subject invention is indicated generally by the numeral 10. The bypass system 10 includes a valve 12 connected to a combustor bypass 13. In the preferred embodiment, two bypass systems 10 are used, one on each side of the combustor and spaced about 180 degrees apart. A different number or arrangement of bypass systems than what is shown here may be preferable depending on the particular engine and application.

Figure 2:
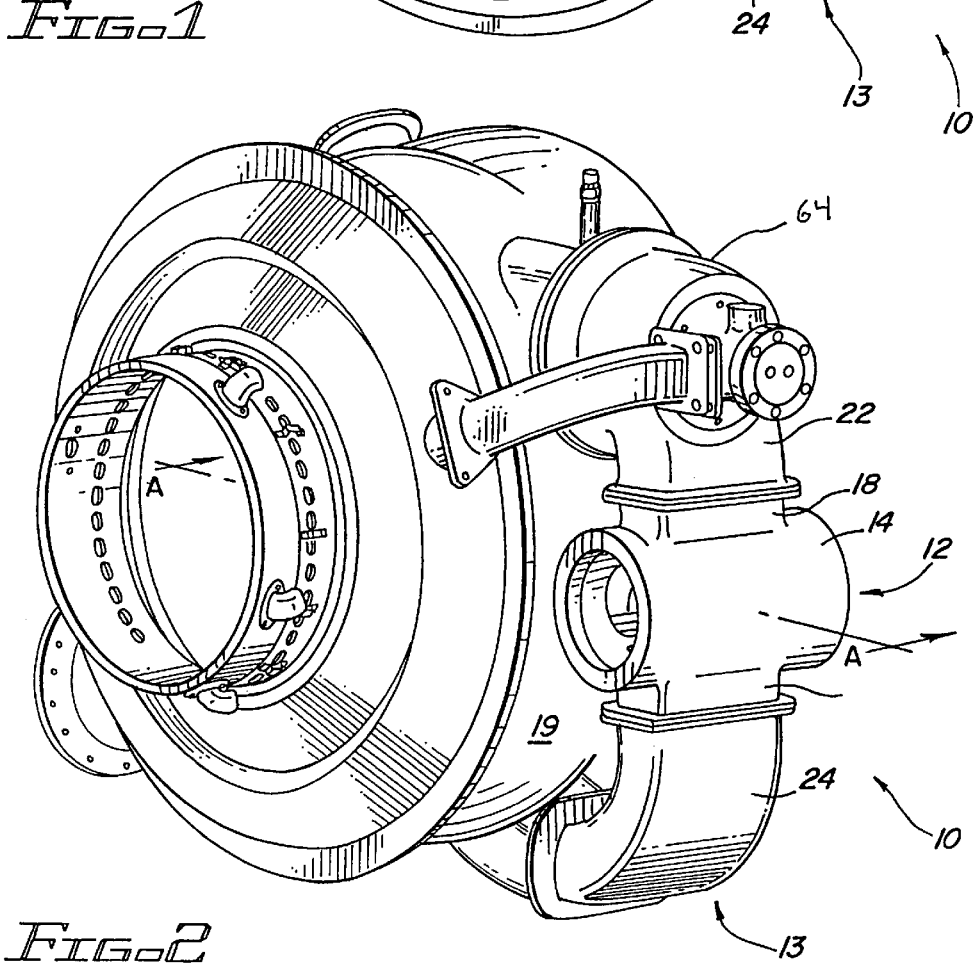
FIG. 2 depicts the combustor of FIG. 1 from a different perspective.
Figure 3:
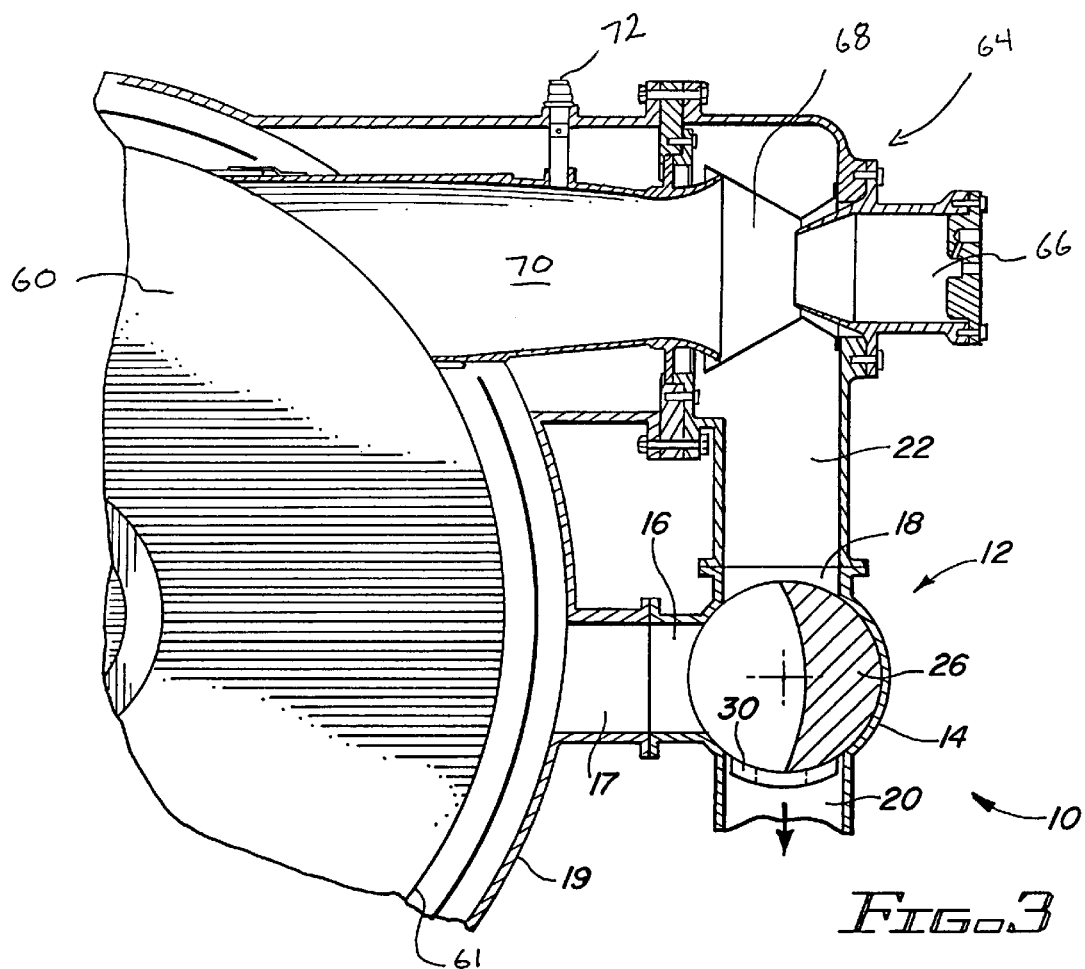
FIG. 3 depicts a sectional view through the combustor and one of the dilution bypass system of FIG. 2 along line A—A.
Figure 4:
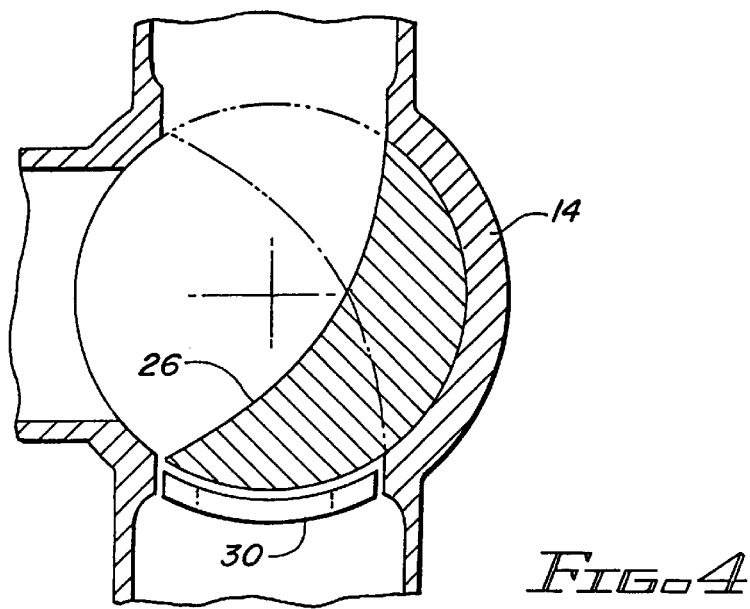
FIG. 4 depicts an enlarged fragmentary sectional view of a portion of FIG. 3.
Figure 5:
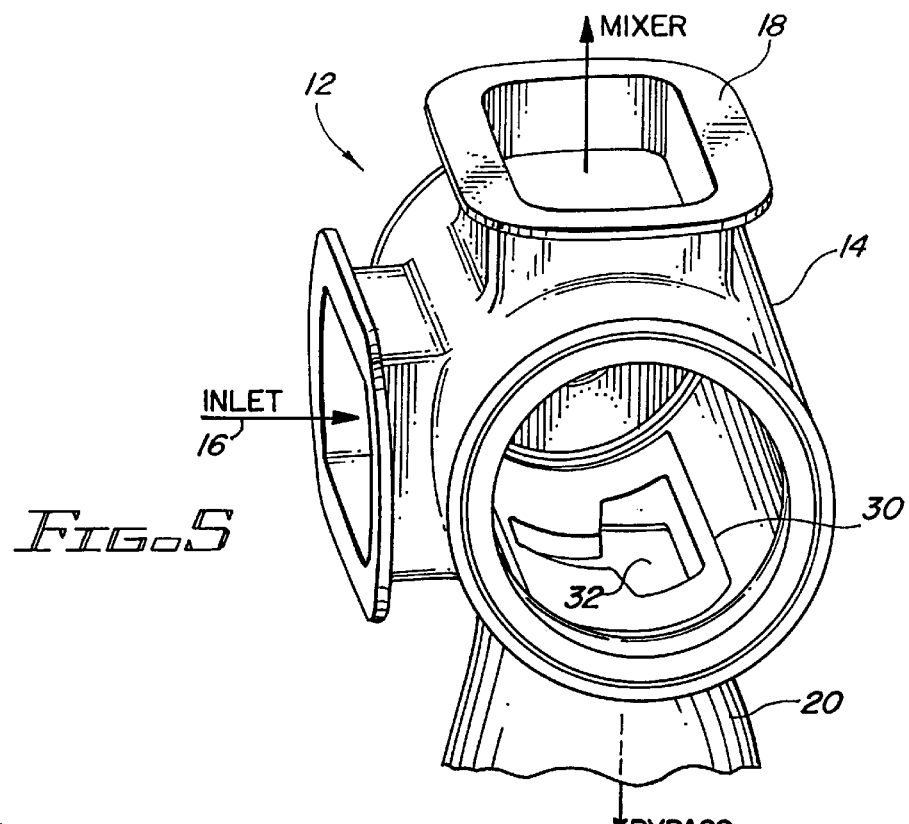
FIG. 5 depicts a perspective view of the valve contemplated by the present invention.

Referring to FIGS. 2 through 4, the valve 12 comprises a cylindrical housing 14 defining an inlet port 16, and two exit ports 18 and 20. Inlet port 16 is connected to an inlet duct 17 for receiving compressed air from the combustor plenum 19 that circumscribes the combustion chamber 60 which is defined by a combustor wall 61. Exit port 18 connects to the premixer duct 22 which leads to the premixer injector 64 that injects tangentially a mixture of fuel and air into the combustion chamber 60. The injector 64 has an air blast fuel nozzle 66, a venturi 70, a premix chamber 68 and an igniter 72. In operation, the air blast nozzle inject a fuel-air mixture into the premix chamber 68. In the premix chamber additional air is added through premixer duct 22. To keep the nitrous oxide as low as possible the fuel air mixture exiting the venturi is as fuel lean as possible. The igniter 72 ignites this lean mixture during engine starting creating a hot gas that flows into the combustion chamber 60. Exit port 20 connects to the bypass duct 24. The valve 12 includes a crescent shaped rotatable valve rotor 26 for selectively controlling the relative proportions of airflow to premixer duct 22 and bypass duct 24.

This flow distributing or dividing function of the valve can be best visualized by referring to FIGS. 3 and 4. As shown in FIG. 4, when valve rotor 26 is in the idle position, (broken line), most of the airflow is directed to bypass duct 24, and very little is directed to the premixer duct 22. Conversely, at maximum power condition, (solid line), most of the airflow is directed to the premixer duct 22, and very little to the bypass duct 24. FIG. 3 depicts an intermediate power setting wherein the valve plate 26 is positioned to evenly divide the flow between the premixer duct and bypass duct. As evident from the drawings, the crescent shape of the rotatable valve rotor 26 provides for a smooth and efficient air flowpath from inlet port 16 to either of the exit ports 18 or 20, particularly at idle and max power conditions.

Figure 6:
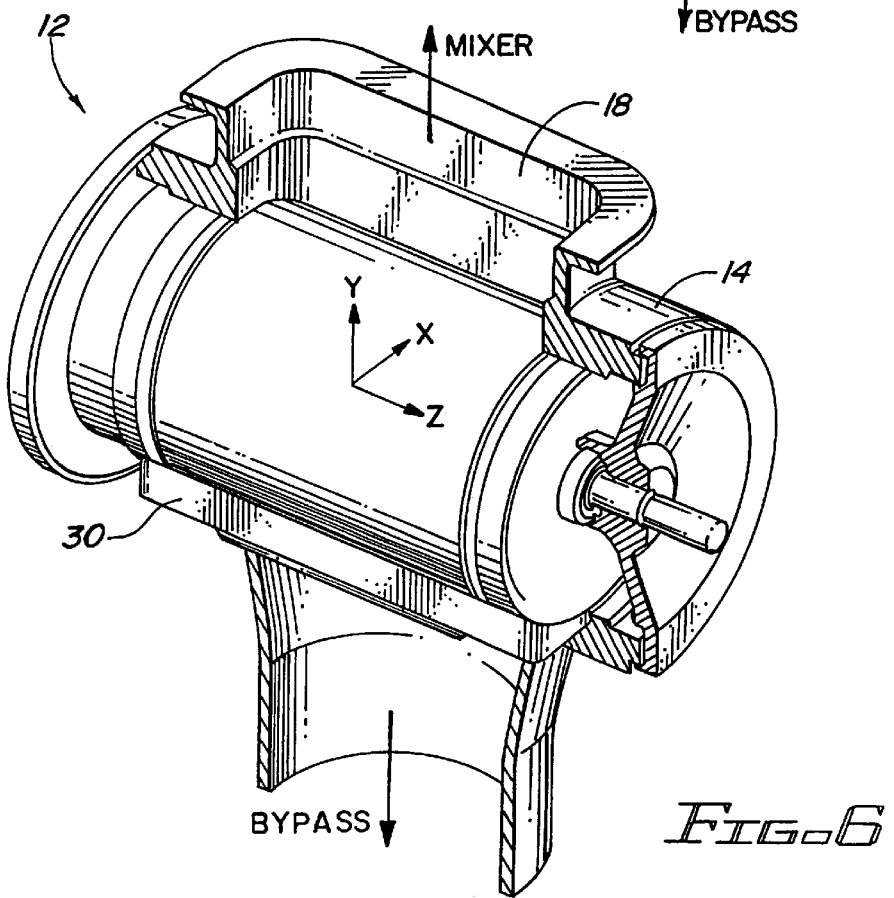
FIG. 6 depicts a partial cut-away perspective view of the valve contemplated by the present invention.
Figure 7:
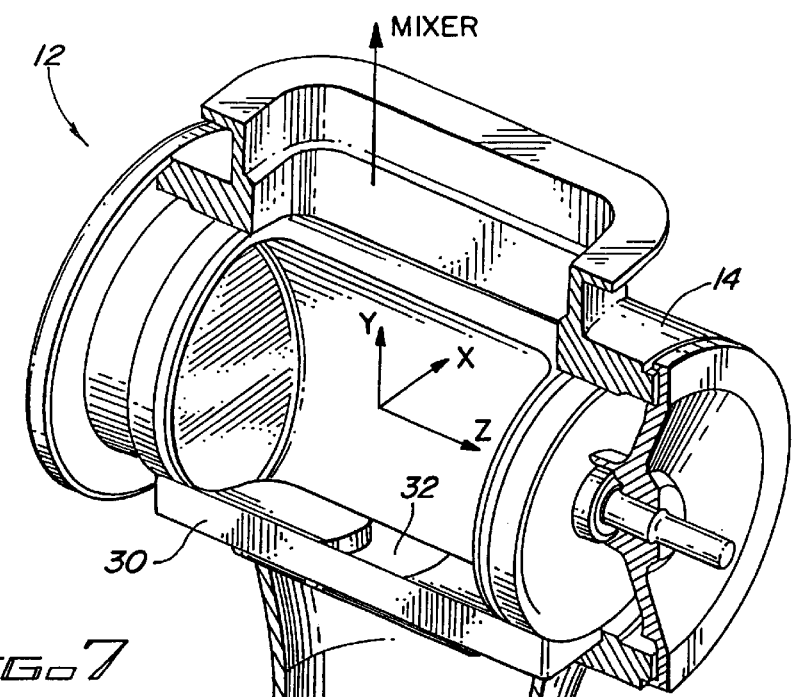
FIG. 7 depicts another partial cut-away perspective view of the valve contemplated by the present invention.
Figure 8:
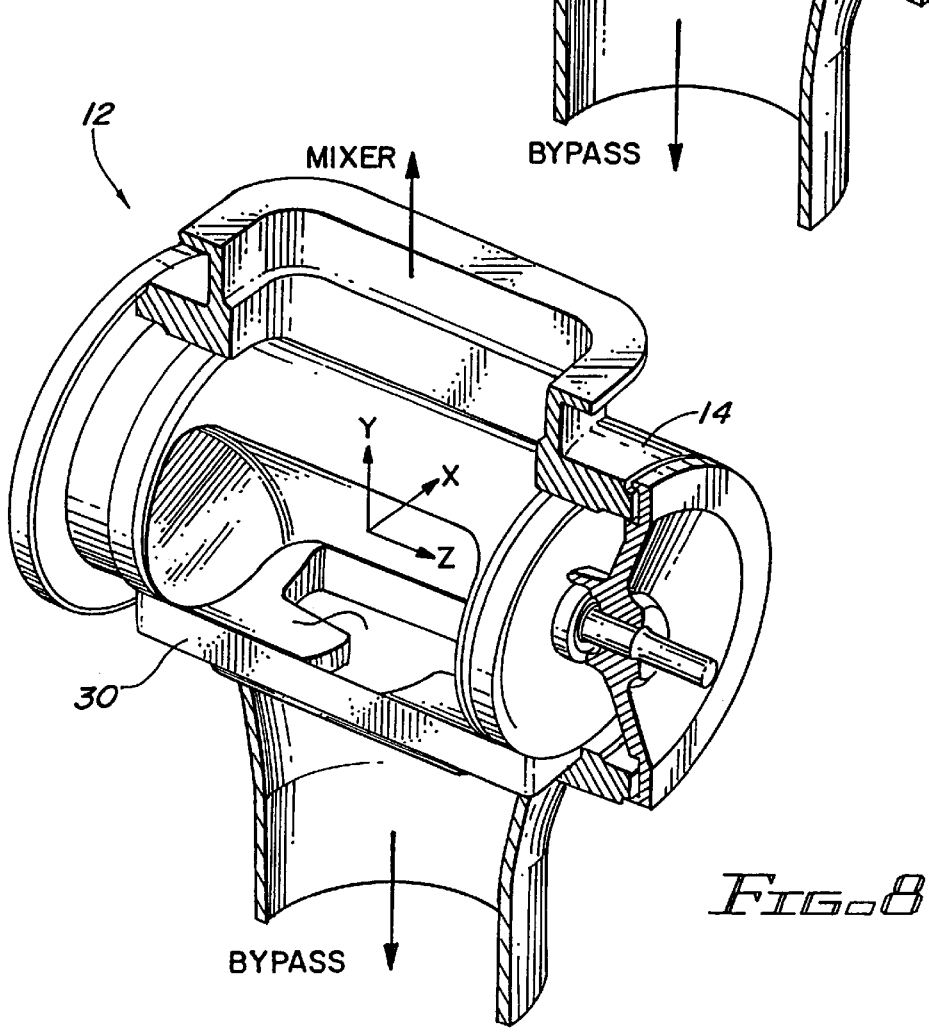
FIG. 8 depicts a third partial cut-away perspective view of the valve contemplated by the present invention.

Referring now to FIGS. 5–8, valve 12 further comprises an exchangeable bypass orifice plate 30 replaceably mounted in the exit port 20. To maintain a constant pressure drop across the combustor and to assure that the right amount of air flows to the premixer injector 64 requires controlling or scheduling the ratio of air supplied to the premixer duct 22 and to the bypass duct 24. The bypass orifice plate 30 includes a variable width orifice 32 for this purpose. By shaping the orifice 32, the ratio of the flow areas of the bypass port to the premixer port can be controlled, and thereby control the ratio of air supplied to each. FIGS. 6 through 8 show valve rotor 26 exposing orifice plate 30 to varying degrees for three power settings. FIG. 6 shows the maximum power condition where the orifice plate is covered. FIG. 7 shows a fifty percent power condition where the orifice plate is approximately half opened. Finally, FIG. 8 shows the shut down power condition where the orifice plate is fully opened and there is no flow to the premixer injector 64. The shape and dimensions of the orifice plate 32 are selected, in a manner familiar to those skilled in the art, for the particular engine design or installation, or desired pressure drop changes at low power conditions.

Figure 9:
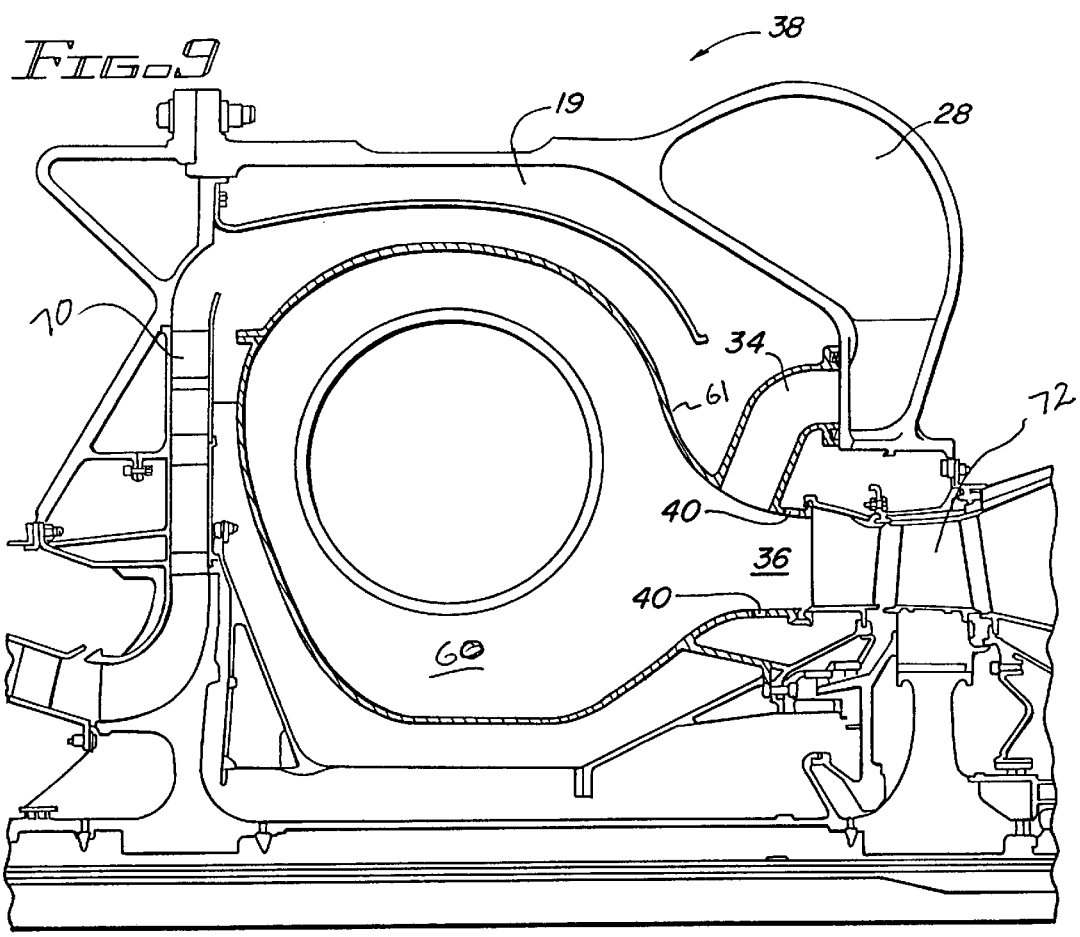
FIG. 9 depicts a transverse sectional view of the combustor of FIG. 1
Figure 10:
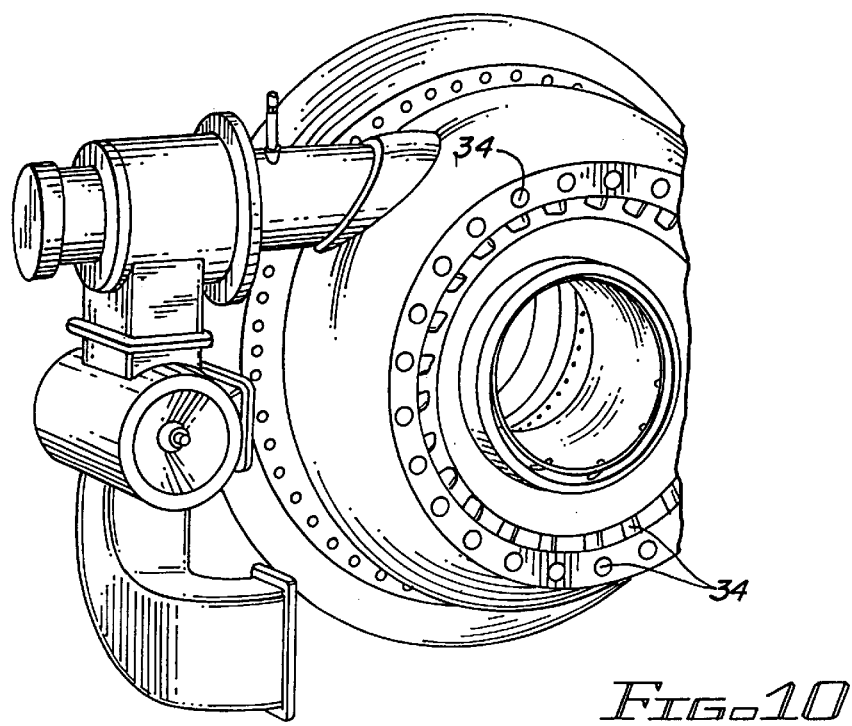
FIG. 10 depicts a perspective view of a portion of the combustor and dilution bypass system.

Referring to FIG. 9, compressed air from compressor 70 enters the combustor plenum 19. As previously described a portion of this air flows from the plenum 19 through the bypass 13. The bypass 13 further includes an annular bypass manifold 28 which receives air from bypass ducts 24. A plurality of tubes 34 extend from and connect bypass manifold 28 to the dilution zone 36 of combustor chamber 60. Together, the valve 12, bypass ducts 24, bypass manifold 28, and tubes 34 provide a clear flowpath with minimal pressure drop for routing compressed air directly from the compressor exit to the dilution zone 36 in generally the same location has the dilution ports 40 just upstream of a turbine 72. Independent of the bypassed air, the dilution ports 40 also receive air from plenum 19.

Figure 11:
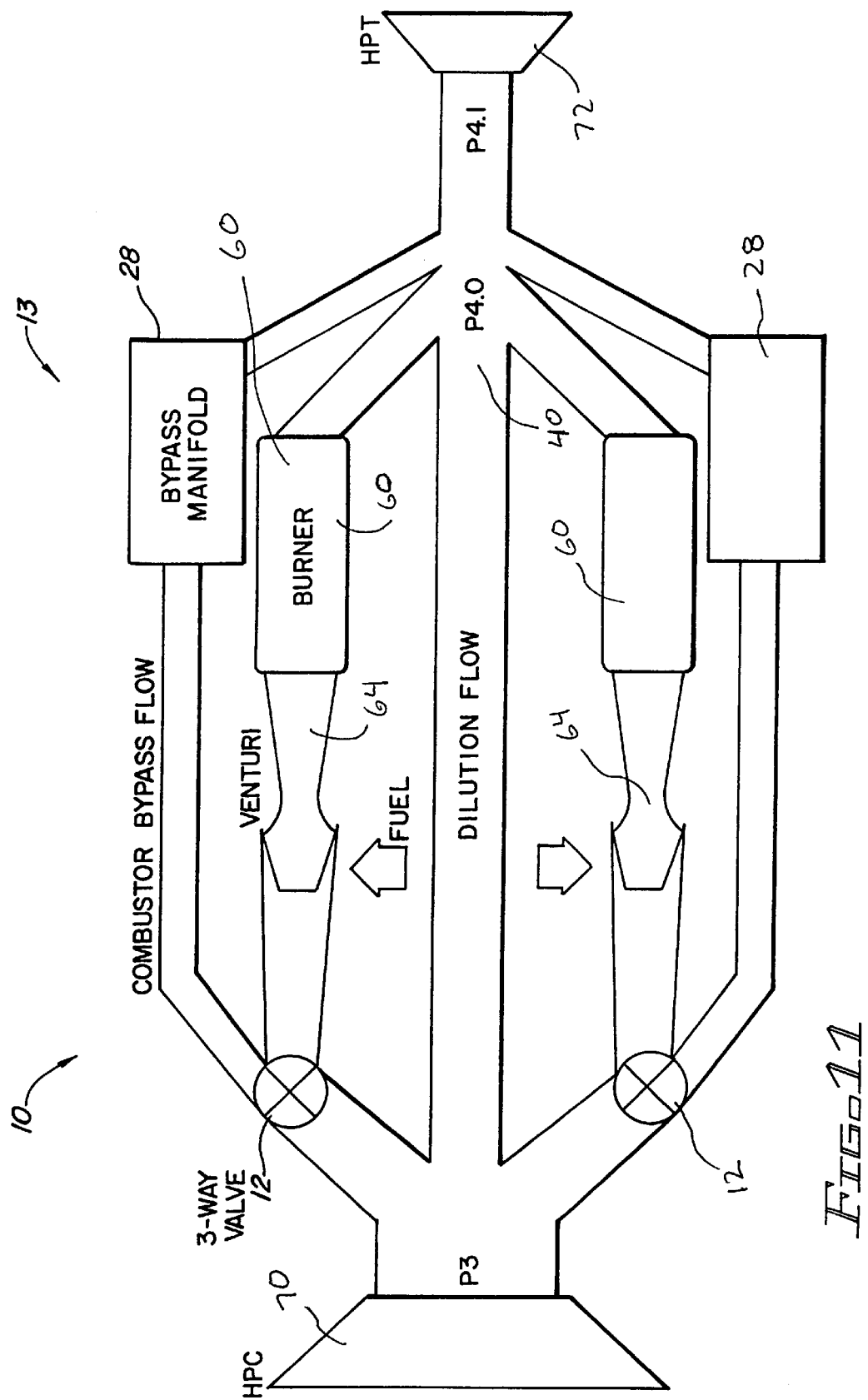
FIG. 11 depicts a schematic view of the combustor dilution bypass system.

FIG. 11 shows schematically how the two bypass systems 10 operate. At maximum power condition, the path to the bypass 13 is closed off, forcing most of the air to the premixer injector 64 and through the combustor chamber 60. Any excess air is then indirectly caused to re-enter the gas flowpath through the dilution ports 40 surrounding the dilution zone 36. Dilution ports 40 are sized for providing efficient flow at this maximum power setting, and so as to produce the desired pressure drop across the combustor. In this condition, the bypass is essentially not utilized.

As power is decreased from maximum, valve 12 is rotated closing off the port 18 leading to the premixer injector. Although engine power is substantially reduced at the idle condition, the total airflow volume being pumped by the compressor is not. Thus at idle power, the volume of excess air, i.e. air not going to the premixer injector increases dramatically. Were it not for the bypass 13, all of the excess air would be directed through the dilution ports 40 resulting in a larger than desired pressure drop across the combustor. However by simultaneously opening the alternate path through the bypass duct, the three way valve allows for the large flow of low power excess air to reach the dilution zone 36 without having to flow through the overly restrictive dilution ports. Rather, the flow is divided, with an appropriate amount flowing through dilution ports 40, and the majority of the excess air flowing through the bypass. Through use of the bypass orifice plate 30, the proper distribution of bypass air, to air through ports 40 can be achieved such that the combustor pressure drop is maintained constant for all operating conditions or can be adjusted as desired at low power settings.

Various modifications and alterations of the above described sealing apparatus will be apparent to those skilled in the art. Accordingly, the foregoing detailed description of the preferred embodiment of the invention should be considered exemplary in nature and not as limiting to the scope and spirit of the invention.

What is claimed is:

1. A method for controlling the pressured drop across a combustor disposed between a compressor and a turbine in a gas turbine engine as the power level of the engine changes, comprising the steps of:
   operating said engine at a first power level;
   collecting pressurized air from said compressor in a plenum;
   flowing a first portion of said air through dilution holes in a wall of said combustor into a dilution zone upstream of said turbine;
   flowing a second portion of said air through a conduit extending from said plenum to an injector;
   mixing the air exiting said conduit with fuel in said injector and igniting the mixture to form a hot gas in said combustor upstream of said dilution zone;
   diverting a portion of the air in said conduit around said injector and into said combustor near said dilution zone; and
   controlling the magnitude of said diverted portion to achieve a first desired pressure drop across said compressor.

2. The method of claim 1 further comprising the steps of;
   operating said engine at a second power level; and
   adjusting the magnitude of said diverted portion to achieve a second desired pressure drop across said combustor.

3. The method of claim 2 wherein said second desired pressure drop equals said first desired pressure drop.

* * * * *